No. 647,288. Patented Apr. 10, 1900.
R. E. BALL.
ROLLER BEARING FOR SHAFTS.
(Application filed Sept. 13, 1899.)

(No Model.) 2 Sheets—Sheet 1.

WITNESSES:
Frank S. Olen
L. V. Carroll

INVENTOR
Royal E. Ball,
BY
Fowler & Fowler
ATTORNEYS

No. 647,288. Patented Apr. 10, 1900.
R. E. BALL.
ROLLER BEARING FOR SHAFTS.
(Application filed Sept. 13, 1899.)
(No Model.) 2 Sheets—Sheet 2.
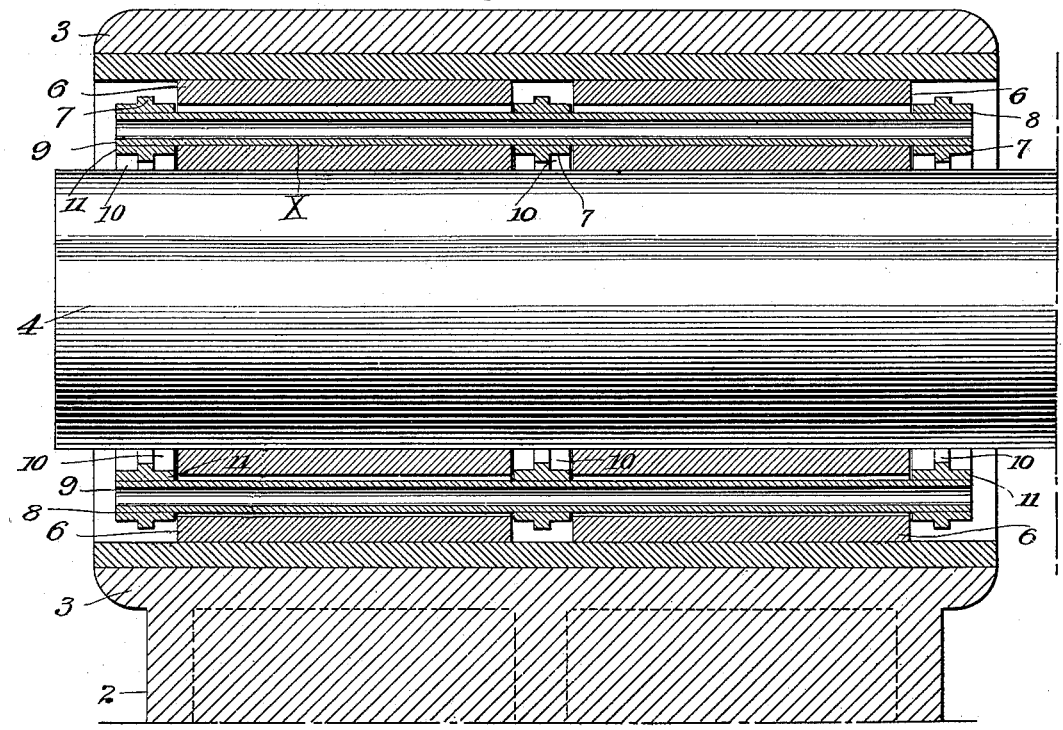
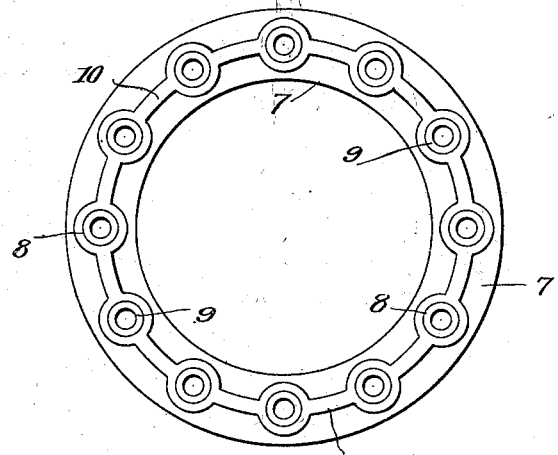
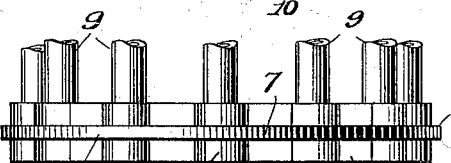
WITNESSES: INVENTOR
Royal E. Ball
BY
ATTORNEYS

UNITED STATES PATENT OFFICE.

ROYAL E. BALL, OF NEW YORK, N. Y.

ROLLER-BEARING FOR SHAFTS.

SPECIFICATION forming part of Letters Patent No. 647,288, dated April 10, 1900.

Application filed September 13, 1899. Serial No. 730,295. (No model.)

*To all whom it may concern:*

Be it known that I, ROYAL E. BALL, a citizen of the United States, residing at New York city, borough of Manhattan, county and State of New York, have invented certain new and useful Improvements in Roller-Bearings for Shafts, of which the following is such a full, clear, and exact description as will enable any one skilled in the art to which it appertains to make and use the same, reference being had to the accompanying drawings, forming part of this specification.

My invention relates to roller journal-bearings; and the principal object of the invention is to provide a bearing of this character that is highly efficient in the reduction of friction and at the same time is light in weight and durable.

To this end my invention consists in the various novel and peculiar arrangements and combinations of the several parts of the device, all as hereinafter fully described and then pointed out in the claims.

I have illustrated a type of my invention in the accompanying drawings, wherein—

Figure 1:
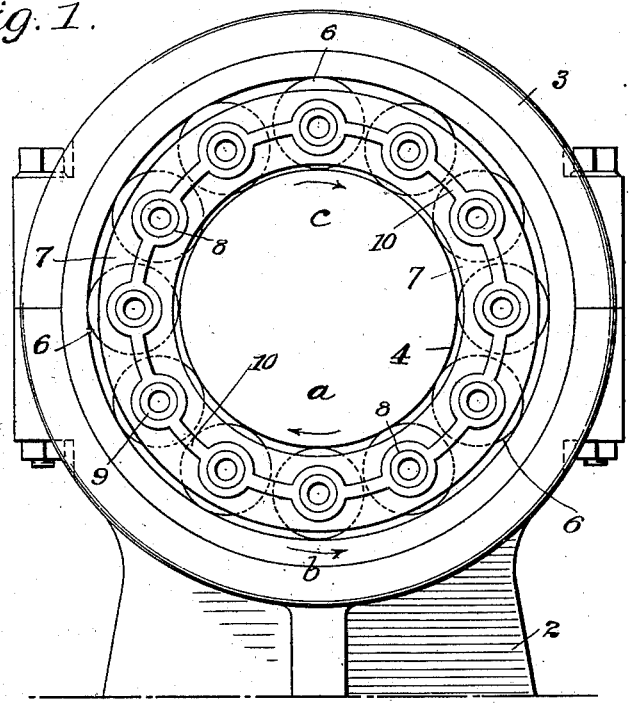
Figure 2:
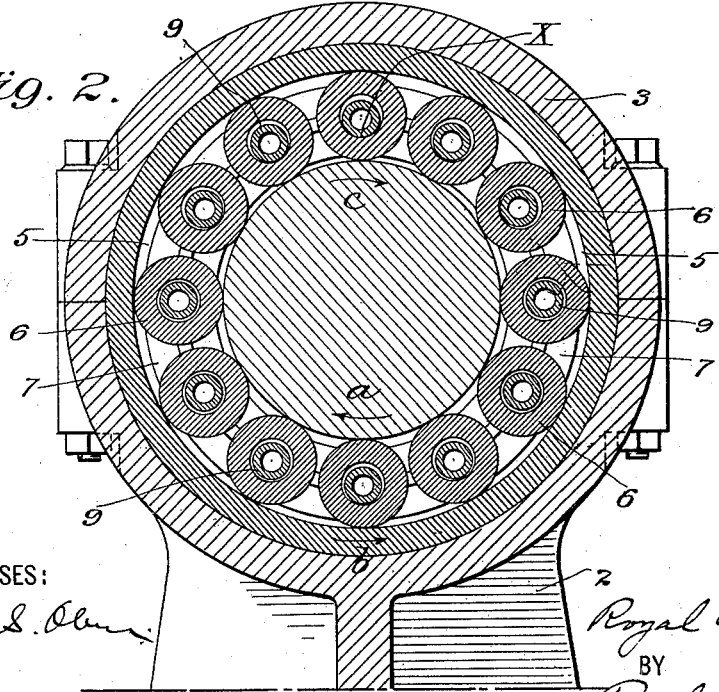

Figure 1 is an end view of my improved roller-bearing with a shaft mounted therein. Fig. 2 is a vertical cross-section of the parts shown in Fig. 1. Fig. 3 is a longitudinal central section of the roller-bearing and shaft. Fig. 4 is an end view of the roller-cage detached. Fig. 5 is an edge view of one of the roller-cage rings, shown with portions of the guide-rods mounted therein.

Referring to the drawings, in which like numbers of reference designate like parts throughout, 2 is a standard or support carrying an ordinary journal-box 3, and 4 is a cylindrical rotary shaft extending within the journal-box, the interior diameter of the journal-box being sufficiently greater than the diameter of the shaft to provide between the two an annular space 5 of suitable width. Within the annular space between the journal-box 3 and the shaft 4 is mounted a set of tubular bearing-rollers 6, of uniform diameter and of the same length, the external diameter of the bearing-rollers being equal to the width of the annular space 5, formed between the shaft and the journal-box, so that each bearing-roller 6 is kept in constant rolling contact with the exterior of the shaft on one hand and the interior of the journal-box on the other.

The tubular bearing-rollers 6 are arranged with their longitudinal axes in the same plane with the axis of the shaft 4, and they are spaced from each other, so as to always be kept out of contact. In order to maintain the rollers with their axes constantly in the same plane as the axis of the shaft and parallel therewith and to prevent the rollers from coming in contact with each other, I provide an annular cage for guiding the rollers. This annular cage comprises a set of similar rings 7, each formed with a like number of similar lateral perforations 8, through which are placed with a driven fit the tubular guide-rods 9.

In the construction shown there are two sets of the tubular bearing-rollers 6, so that the roller-cage is made up with three of the spacing-rings 7, which support the guide-rods 9. Of course any desired number of sets of the tubular bearing-rollers 6 may be used, and in each case the sets should be separated from each other by a spacing-ring, 7 as shown.

The guide-rods 9 are made tubular to lighten the weight of the structure, and they are made as light as is consistent with the necessary strength. The spacing-rings 7 are likewise made as light as possible and are reinforced by an annular web or rib 10, running around each face of the ring. Each perforation 8 is provided upon each side of the ring with a tubular boss 11, forming a bearing for the guide-rods 9, which extend therethrough. These annular bosses or flanges 11 also serve to strengthen the ring. The various parts of the device may be made of any suitable well-known metal in order to make the same light and durable. I have used with good results ordinary gun-metal for the tubular bearing-rollers 6 and steel for the guide-rods 9.

In theory the roller-bearing is almost frictionless; but practice shows that some means must be adopted for keeping the rollers with their axes constantly in the same plane with the axis of the shaft and parallel therewith, and while the addition of such a device necessarily adds to the friction produced, nevertheless the character and arrangement of my improved roller-cage are such as to minimize the added friction. Of course the weight of the roller-cage is sustained by the bearing-rollers 6, and in order to have as little contact as possible between the tubular guide-rods 9 and the incasing rollers 6 I make the exterior diameter of the guide-rod considerably smaller than the internal diameter of the roller, and, furthermore, I make the diametrical distance apart of the rods of the roller-cage (from center to center) slightly less than the distance apart of the center of rollers 6. In other words, the circle containing the axes of the set of tubular guide-rods is slightly smaller than the circle containing the axes of the tubular rollers 6. By virtue of this arrangement I cause the roller-cage to be supported in the rollers by the uppermost guide-rod resting in the bottom of the interior of the uppermost roller, as shown at the point X in Figs. 2 and 3. Thus the roller-cage is sustained at one point, and this point constantly changes from one guide-rod and its roller to the next succeeding guide-rod and roller as the latter are brought on top by the translatory movement of the set of bearing-rollers. It will be observed that the tubular rod 9 and roller 6 in contact at the point X both move in the same direction, and hence the friction between them is slight. At all other points of the revolution there is no friction, as the rods and their incasing rollers are not in contact. By virtually hanging the cage on the upper roller alone and keeping the other guide-rods clear of their respective rollers I am able to obtain a high efficiency of the bearing.

In the operation of the device as the shaft rotates in the direction of the arrow $a$ each roller 6 turns on its axis in an opposite direction to the shaft, as indicated by the arrow $b$. (See Figs. 1 and 2.) While the set of rollers 6 rotate on their axes in the opposite direction to the shaft, at the same time the rollers have a translatory movement in the direction of rotation of the shaft, as per the arrow $c$, and the roller-cage is caused to rotate in the same direction. I have found this character of roller-bearing very efficient in the reduction of friction, and in some cases the friction is so small that I am able to run the bearing without a lubricant.

I wish to be understood as not limiting my invention to the specific construction of the various parts thereof as herein shown, as various modifications may be made in the same without departing from the spirit of my invention.

Having thus described my invention, what I claim, and desire to secure by Letters Patent, is—

1. The combination of a rotary shaft, a concentric journal-box having an interior diameter considerably larger than the diameter of the shaft to provide an annular space between the two, a set of tubular rollers fitting within said annular space and traveling in contact with said shaft and journal-box, a rotary annular roller-cage provided with a set of longitudinally-extending guide-rods, one passing loosely through the interior of each of said tubular rollers and each rod having a diameter considerably less than the interior diameter of said rollers, the circle upon which the axes of said guide-rods are arranged being of less diameter than the circle containing the axes of said tubular rollers, substantially as and for the purpose set forth.

2. The combination of a rotary shaft, a concentric journal-box having an interior diameter considerably larger than the diameter of the shaft to provide an annular space between the two, a set of tubular rollers fitting within said annular space and traveling in contact with said shaft and journal-box, a rotary annular roller-cage provided with a set of longitudinally-extending tubular guide-rods, one passing loosely through the interior of each of said tubular rollers and each having a diameter considerably less than the interior diameter of said rollers, the circle upon which the axes of said guide-rods are arranged being of less diameter than the circle containing the axes of said tubular rollers, substantially as and for the purpose set forth.

3. The combination of a rotary shaft, a concentric journal-box having an interior diameter considerably larger than the diameter of the shaft to provide an annular space between the two, a set of tubular rollers fitting within said annular space and traveling in contact with said shaft and journal-box, a rotary annular roller-cage comprising a set of uniform-sized parallel rings arranged concentrically and a set of longitudinally-extending guide-rods extending through said rings parallel with the axes thereof for carrying the tubular rollers, said rings being provided upon their sides with a reinforcing-web extending around the same, substantially as and for the purpose set forth.

4. The combination of a rotary shaft, a concentric journal-box having an interior diameter considerably larger than the diameter of the shaft to provide an annular space between the two, a set of tubular rollers fitting within said annular space and traveling in contact with said shaft and journal-box, a rotary annular roller-cage comprising a set of uniform-sized parallel rings arranged concentrically and a set of longitudinally-extending guide-rods extending through said rings parallel with the axes thereof for carrying the tubular rollers, each of said rings being formed with lateral perforations for receiving the guide-rods and having a tubular boss upon its sides thereof surrounding said opening, substantially as and for the purpose set forth.

In testimony whereof I have hereunto set my hand, this 24th day of August, 1899, in presence of the two subscribing witnesses.

ROYAL E. BALL.

Witnesses:
J. SIDNEY BELL,
JAMES W. PATTERSON.